(12) United States Patent
Nielsen

(10) Patent No.: US 10,729,071 B2
(45) Date of Patent: Aug. 4, 2020

(54) VALUE-TIME GRAPHICAL USER INTERFACE FOR INDEPENDENT FREQUENCY CONTROL OF THE SHAKER HEAD OF A HARVESTER

(71) Applicant: Nexgen Ag, LLC, Chico, CA (US)

(72) Inventor: Gavin Nielsen, Chico, CA (US)

(73) Assignee: Nexgen Ag, LLC, Chico, CA (US)

( * ) Notice: Subject to any disclaimer, the term of this patent is extended or adjusted under 35 U.S.C. 154(b) by 427 days.

(21) Appl. No.: 15/610,203

(22) Filed: May 31, 2017

(65) Prior Publication Data

US 2017/0344219 A1    Nov. 30, 2017

Related U.S. Application Data

(60) Provisional application No. 62/343,716, filed on May 31, 2016, provisional application No. 62/343,723, filed on May 31, 2016, provisional application No. 62/343,732, filed on May 31, 2016, provisional application No. 62/343,727, filed on May 31, 2016.

(51) Int. Cl.
| | |
|---|---|
| *A01D 46/26* | (2006.01) |
| *G06F 3/0488* | (2013.01) |
| *A01D 75/00* | (2006.01) |
| *G06F 9/451* | (2018.01) |
| *G06F 3/0484* | (2013.01) |

(52) U.S. Cl.
CPC ............ *A01D 46/26* (2013.01); *A01D 75/00* (2013.01); *G06F 3/04847* (2013.01); *G06F 3/04886* (2013.01); *G06F 9/453* (2018.02); *A01D 2046/266* (2013.01); *G06F 9/451* (2018.02); *G06F 2203/04808* (2013.01)

(58) Field of Classification Search
CPC .. A01D 46/26; A01D 75/00; A01D 2046/266; G06F 3/04847; G06F 3/04886; G06F 2203/04808; G06F 9/453; G06F 9/451
See application file for complete search history.

(56) References Cited

U.S. PATENT DOCUMENTS

| | | | |
|---|---|---|---|
| 4,286,426 A | 9/1981 | Orlando et al. | |
| 4,982,558 A | 1/1991 | Korthuis | |
| 5,259,177 A | 11/1993 | Windemuller et al. | |
| 5,473,875 A | 12/1995 | Zehavi et al. | |

(Continued)

OTHER PUBLICATIONS

Conway, Joe, iOS Programming: The Big Nerd Ranch Guide (Feb. 2014), Chapter 12: Touch Events and UI Responder. (Year: 2014).*

(Continued)

*Primary Examiner* — Alexander Satanovsky
*Assistant Examiner* — Mark I Crohn
(74) *Attorney, Agent, or Firm* — Dergosits & Noah LLP

(57) ABSTRACT

A graphical user interface is disclosed for controlling a harvesting system, the harvesting system driving each of two shaking actuator frequencies individually, the user interface setting or displaying the frequencies of the two actuators as a Value-Time User Interface (VTUI). The VTUI shows shaking parameters in the vertical axis against time in the horizontal axis, the VTUI able to be used to control the shaker in real time, to create and edit a shake pattern, and to display values of shake parameters as the shake is occurring.

12 Claims, 8 Drawing Sheets
(2 of 8 Drawing Sheet(s) Filed in Color)

(56) References Cited

U.S. PATENT DOCUMENTS

| | | | |
|---|---|---|---|
| 6,405,516 | B1 | 6/2002 | Orlando |
| 7,918,078 | B2 | 4/2011 | Poggiagliolmi |
| 8,511,051 | B2 | 8/2013 | Pellenc et al. |
| 8,650,847 | B2 | 2/2014 | Snell |
| 9,060,465 | B2 | 6/2015 | Vande Voort et al. |
| 9,992,933 | B2 | 6/2018 | Payne |
| 2011/0047956 | A1* | 3/2011 | Snell ............... A01D 46/26 56/340.1 |
| 2014/0132531 | A1* | 5/2014 | Lee ..................... G06F 3/01 345/173 |
| 2016/0144404 | A1* | 5/2016 | Houston ............. B06B 1/166 318/114 |

OTHER PUBLICATIONS

Marshall W. Johnson, Cooperative Extension Specialist & Entomologist, Department of Entomology, University of California, Riverside, CA 92521, "California Olive Committee, Annual Research Report 2008," (Jan. 20, 2009), 97 pages. (Year: 2009).*

Marshall W. Johnson, Cooperative Extension Specialist & Entomologist, Department of Entomology, University of California, Riverside, CA 92521, "California Olive Committee, Annual Research Report 2008," (Jan. 20, 2009), 97 pages.

Declaration of Gavin Neilsen Under 37 CFR 1.56, U.S. Appl. No. 15/610,356, filed May 3, 2017, signed Apr. 24, 2019, 50 pages.

Document A, referenced within the Declaration of Gavin Nielsen filed herewith.

Document B, referenced within the Declaration of Gavin Nielsen filed herewith.

Document C, referenced within the Declaration of Gavin Nielsen filed herewith.

Document D, referenced within the Declaration of Gavin Nielsen filed herewith.

Document E, referenced within the Declaration of Gavin Nielsen filed herewith.

Document F, referenced within the Declaration of Gavin Nielsen filed herewith.

Document G, referenced within the Declaration of Gavin Nielsen filed herewith.

Document H, referenced within the Declaration of Gavin Nielsen filed herewith.

Document I, referenced within the Declaration of Gavin Nielsen filed herewith.

* cited by examiner

VALUE-TIME GRAPHICAL USER INTERFACE FOR INDEPENDENT FREQUENCY CONTROL OF THE SHAKER HEAD OF A HARVESTER

CROSS-REFERENCE TO RELATED CASES

This application claims priority to the following U.S. Provisional Patent Applications, which are each incorporated by reference in their entirety: U.S. Provisional Patent Application No. 62/343,727, entitled "A VALUE-TIME GRAPHICAL USER INTERFACE FOR INDEPENDENT FREQUENCY CONTROL OF THE SHAKER HEAD OF A HARVESTER," filed May 31, 2016; U.S. Provisional Patent Application No. 62/343,723, entitled "A FREQUENCY-FREQUENCY GRAPHICAL USER INTERFACE FOR INDEPENDENT FREQUENCY CONTROL OF THE SHAKER HEAD OF A HARVESTER," filed May 31, 2016; U.S. Provisional Patent Application No. 62/343,716, entitled "INDEPENDENT FREQUENCY CONTROL OF THE SHAKER HEAD OF A HARVESTER," filed May 31, 2016; and U.S. Provisional Patent Application No. 62/343,732, entitled "COOLING SYSTEM FOR A SHAKER HEAD OF A HARVESTER," filed May 31, 2016.

TECHNICAL FIELD

The present invention relates to the field of agricultural technology, including, more particularly, to methods and systems for harvesting tree crops.

BACKGROUND

Agricultural harvesting for many different tree crops is accomplished through inertial trunk shaking. Exemplary crops include almonds, pistachios, prunes, olives and walnuts, to name a few. With inertial trunk shaking, a portion of the machine, called the "shaker head" is clamped onto the trunk or a major scaffold of the tree. Then eccentric weights are made to spin and generate inertial forces that transfer vibration into the tree. The vibration travels up the tree and through the branches, ultimately causing the product to detach and fall either to the ground or to a catching frame. For many crops and in many places this practice has replaced hand-harvesting methods, which are costly and challenging for growers. The practice also helps optimize the use of land area. Realizing these benefits makes growers more competitive in the global market.

One challenge that faces operators of this equipment is the appropriate tuning of this system to best remove product while minimizing damage to the tree; a challenging balance because these are diametrically opposed optimization targets. Currently, this challenge is addressed primarily "in the lab" (or probably in a workshop), through trial and error, where a reasonable baseline speed, or frequency, is established through various gearing techniques. Since one wants to optimize the frequency to be close the right natural frequencies of the tree, lab optimization begins to improve the frequency issue, but for simplicity of design, existing machines typically work with two eccentrics that are in a fixed ratio relationship to that baseline frequency. This ratio is typically a function of non-adjustable gearing, which means that even with the small changes to the baseline frequency that a change to the engine throttle might produce, the ratio of the speeds stays fixed. This leads to the second challenge: optimization of output geometry.

The geometric position output of a shaker head (in the horizontal plane) that has a single, spinning eccentric is a simple ellipse. When two eccentrics are spinning at different frequencies, this ellipse changes to be a trochoid. In general, the equation that governs the output position of the head (working from a simplified, free-body-diagram point of view), is shown below:

$$x(t) = E_1 \cos(F_1 * t) + E_2 \cos(F_2 * t) \qquad \text{(Eq. 1)}$$

$$y(t) = E_1 \sin(F_1 * t) + E_2 \sin(F_2 * t)$$

$$F_b = F_1 - F_2$$

$$E_r = E_1 / E_2$$

$$F_r = F_1 / F_2 \qquad \text{(Eq. 2)}$$

Where
x(t) is the horizontal position of the head (in the horizontal plane) as a function of time
y(t) is the vertical position of the head (in the horizontal plane) as a function of time
$E_1$ is the eccentricity of the first eccentric (with dimension mass*length)
$E_2$ is the eccentricity of the second eccentric (with dimension mass*length)
$F_1$ is the frequency of the first eccentric (with dimension time$^{-1}$)
$F_2$ is the frequency of the second eccentric (with dimension time$^{-1}$)
t is time
$F_b$ is the beat frequency (difference in the constituent frequencies)
$E_r$ is the eccentricity ratio (dimensionless)
$F_r$ is the frequency ratio (dimensionless)

For linear actuators, E1 and E2 may be functions of time. This can be accomplished by varying the magnitude of the travel (peak-to-peak) of the moving mass. For a given frequency, as one increases the peak-to-peak magnitude of travel, the output will also increase. This also leads to nearly arbitrary output geometry and super-positioned frequencies, since there is no restriction that physics imposes any more to have a sinusoidal output per axes. X(t) and Y(t) become nearly arbitrary, though there are practical limitations for the length of travel of each actuator and for the mass/frequency combinations that result in force/power output limitations. For example, at any given time the actuator could deliver varying forces at a given frequency or vary frequencies at a given force. But, because of the inertial properties of the mass at the end of the linear actuator and the total travel capability of the actuator and the maximum speed of the actuator and the internal actuator force limitations, the actuator itself will be bounded only, it will have upper and lower bounds for those forces. In the same way, the output geometry size will have maximum bounds and the output frequencies will have minimums and maximums related to the same parameters. The shape of the trochoid (not the absolute size) can be completely determined by the ratio of eccentricities and the ratio and sign of frequencies. Since a typical machine has fixed eccentrics and (as already described) fixed frequency ratios, the geometric position output of a typical head does not vary at all, regardless of the baseline frequencies and size of the eccentrics.

FIG. 1 depicts examples of trochoid shapes based on different frequency ratios. With $E_r$ fixed at the value of 1.6667 and $F_r$ varied, FIG. 1 depicts the resulting variety of trochoid shapes generated.

Each tree, as a complex mechanical structure, is unique in its vibratory transmission characteristics. Good cultural practices in pruning and consistency in treatment tend to yield statistically similar trees in a given block but this really depends on many other factors that are out of control of the grower, such as soil-type distribution throughout a given block. Additionally, hand-pruning is usually carried out by manual laborers, who vary significantly in their judgment calls as to what constitutes a wise choice for pruning cuts (and pruning cuts dictate much of the vibratory transmission characteristics). Soil moisture levels change constantly due to environmental factors such as weather and water availability, which changes the characteristics of the effective fulcrum formed by the ground and the trunk. Root structure varies significantly, which also changes how "soft" that ground-trunk fulcrum behaves. Furthermore, as a tree grows the mechanical properties of the wood change with age, as well as the size and geometry of the tree.

Year-to-year crop loads change dramatically, and different crop loads require different types of frequencies and geometries. In short, there is such vast variability from tree to tree that existing shakers often shake much harder than they need to, and shake at the wrong frequencies and wrong geometries—dumping unnecessary energy into the tree. This energy is lost in other forms (other than kinetic energy at the product), typically in short or long-term damage to the tree (e.g., root damage, trunk damage, scaffold/branch damage, defoliation, etc.). In addition, some of the crop is often left on the tree, which for the grower is literally unrealized profit.

Lastly, a tree's mechanical system changes as a shake is taking place because the crop is being removed, which changes the tree's mass distribution and the natural frequencies. The mechanical system also changes because the roots are moving in the ground, which changes how the soft fulcrum behaves. Different crops types and ages of trees evolve their dynamic state at different rates and have different safe envelopes.

It is not impossible to change the gearing of a typical shaker head: new sheaves, pumps, motors, etc., can be swapped in to create a new (albeit fixed) ratio. The problem with this is that it takes a large amount of time (often hours) to make this change just once. Such "tuning" of the shaker is very inefficient and time-expensive. In the middle of a harvest, time is money. Therefore, there is a disincentive to take the time (money) to try and make adjustments to a shaker head once a user feels that they are close enough.

For example, a typical tuning is usually performed "at the shop" and accomplished by changing the combination of gears, sprockets, pumps, motors, etc. Such tuning is not typically performed in the field. The small amount of tuning that is done in the field generally amounts to the following: tuning the eccentrics (typically two different eccentrics—e.g., changing their weights and manually setting a fixed speed ratio between the two), and either setting a fixed engine RPM level, or figuring out the sequence of how to move the throttle pedal to get the response wanted (very rough).

However, the typical tuning is unsatisfactory for a number of reasons. For example, tuning by way of engine throttle does not tune each eccentric individually, since they are each turning at a fixed ratio to the engine RPM. Tuning by way of varying the throttle via a pedal or lever, also does not allow a consistent, transient response—if the user is supposed to follow a shaking procedure by changing the engine throttle with their foot, it is very hard to make that procedure repeatable. Manually setting a fixed engine speed does not allow a user to take advantage of their real-time perception of how a tree responds to a particular shaking procedure. Setting a fixed or manual speed does not allow any intuitive sense or feel for the pattern, which is critical in converging upon an optimal shaking pattern without an automated solution. And, as discussed, the process is time-consuming. Other methods are very slow, while this method can literally be in real-time.

In the United States, there are three major players in the inertial trunk shaker space for fruit and nut harvesting. These systems typically feature a self-propelled chassis, a carriage, a shaker head with a two-jaw clamping system. They typically feature a two-eccentric system driven by a single motor coupled by belts and sprockets of different diameters to accomplish the fixed frequency ratio.

Orchard Machinery Corporation (OMC) is located in Yuba City, Calif. and produces a wide range of equipment for the orchard. Their current website address is www.shakermaker.com. They currently produce side-by-side systems (Magnum Catchall VII Series II), monoboom systems (Magnum Monoboom Series V), side-mount systems (Magnum Sprint Series V) and umbrella systems (Catchall V).

Orchard-rite Ltd., Inc. is located in Yakima, Wash. and produces several models, all targeted at nut shaking in particular. Their current website is www.orchard-rite.com. They produce a side-mount system (The Bullet) and a monoboom system (The MonoBoom).

Coe Orchard Equipment is located in Live Oak, Calif. and produces a variety of different equipment. Their current website is www.coeshakers:com. They produce a side-by-side system (The C7-E Shaker and L2-E Receiver), a side-mount system (S7 Side Mount Shaker) and a monoboom system (The M7 Mono Boom Shaker).

Therefore, there exists a need for a tree harvesting technology that can easily modify key characteristics of its shaker head to provide more optimal tuning to accommodate different trees and changing conditions. Those elements in question are the head's frequencies, specifically the individual frequencies themselves and in combination, the ratio between them.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The embodiments are illustrated by way of example and not limitation in the figures of the accompanying drawings, in which like references indicate similar elements, and in which.

DETAILED DESCRIPTION

Figure 1:
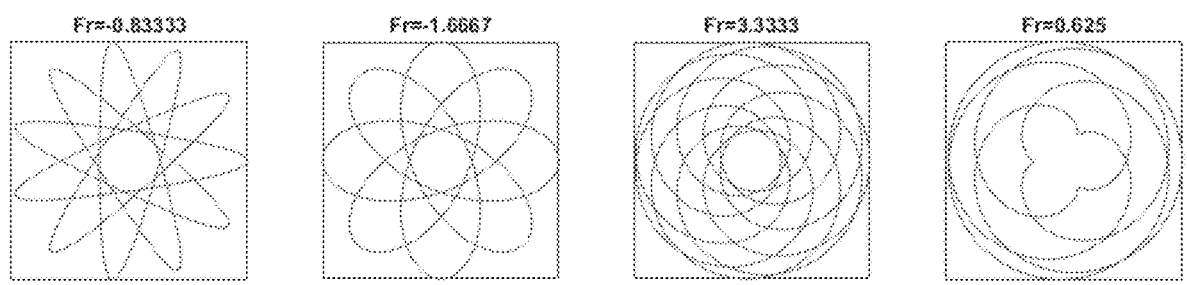
FIG. 1 depicts examples of trochoid shapes based on different frequency ratios.

Embodiments described within provide a tree harvesting technology that can easily modify key characteristics of its shaker head to provide more optimal tuning to accommodate different trees and changing conditions. The embodiments include graphical user interfaces for controlling a system that drive a shaker head's shaking frequencies, specifically the individual frequency of each rotating or vibrating mass and, in combination, the ratio between them. Embodiments include an apparatus that may control each of the eccentric frequencies individually—a Value-Time [Graphical] User Interface (VTUI). Driving the eccentric frequencies independently (Independent Frequency Control (IFC)) gives the flexibility to adapt the harvesting procedure to different trees and also to design patterns out in the field that evolve during the shake of an individual tree. Instead of making any assumptions about the right ratio or speeds, embodiments of IFC make the time-frequency profile of each eccentric independent. Since these frequencies combine to form a beat frequency as well, IFC also provides indirect control of the beat frequency resultant, which adds another facet of control to give more freedom to the person in the field who performs the tuning.

An embodiment of a VTUI discloses a way to control IFC. In an embodiment of VTUI a touchscreen graphical user interface displays a set of user interface elements that allow intuitive visualization and quick and efficient editing of the time vectors related to IFC. With VTUI, the time-sampling of the vectors is constant, so editing any given vector is one-dimensional, which makes the editing very intuitive. For example, editing the vector associated with the first eccentric—the frequency 1 vector—simply requires that the user indicate they wish to edit that vector. Then as the user moves the cursor or a stylus over a time position, the vector value snaps to the cursor or stylus value for that time position. This allows the user to "trace" the desired shape in time, which is very natural and makes the editing intuitive. Thus, an embodiment allows for intuitive editing and visualization of aspects of the shake profile. In an embodiment, straight, horizontal lines represent constant values in time. In an embodiment, the influence of one quantity upon another may be shown immediately—resulting from each quantity potentially driving dependent quantities (e.g. changing frequencies immediately affects peak force output with a constant eccentric situation). In an embodiment, slew rate limiters may be applied to help the user understand how fast (or slow) the system can respond to a request. For example, because of the rotational inertia, the system cannot move from 10 RPM to 1000 RPM in 100 milliseconds because the system does not typically have the necessary power. This is also shown by the distance from each "dot" or point in the plot area, and relates to the vertical distance between neighboring points.

An embodiment of a VTUI discloses a way to control IFC. IFC provides more control over the shaking process. An embodiment of VTUI embodiment abstracts the shake pattern tuning process—providing a better way for the user to view and use the enhanced control provided by IFC. In a tuning process a user chooses the parameters for shaking the tree, e.g., frequencies, duration at a given frequency, etc. In the embodiment, a touch-screen graphical user interface maps the speeds and directions (two, signed variables) to the interface display. Once the shake is initiated the interface begins to capture coordinate positions at that fixed sample rate and build the two frequency/time vectors. In this way, an embodiment may either "record" a new shaking pattern without controlling the machine, or the embodiment may record that new shaking pattern while a user controls the machine in real-time. Non-real-time editing (no automated recording) means that, in an embodiment, a user could edit these coordinate points and traverse both time and the dependent variable, e.g., frequency (on the plane of the screen) to make large or small adjustments to the pattern. An embodiment may be used in real-time, which allows the tuning to be interactive. An embodiment may allow non-real-time tuning processes (e.g., saved processes and processes created in total before being used) to be edited, which among other things would allow for short shakes and subtle changes. An embodiment may allow instantaneous feedback, e.g., the geometry, force output, and frequency combination at the current position. An embodiment may be run on a remote interface away from actual shaking apparatus, with the embodiment operating on a computing system that is connected to the shaking apparatus, e.g., tethered or wireless. An embodiment may allow a user to look away from the display and at the tree being harvested—allowing the user to make use of their own senses in determining the effectiveness of the shake taking place. If wirelessly connected, a user may move to an advantageous vantage point for observing and hearing how the tree is responding. An embodiment may also account for the setup of the shaking apparatus, e.g, the values of the eccentrics. An embodiment may allow more sophisticated and dynamic shaking patterns. Embodiments may improve tree harvesting technology, which in turn may result in reduced food prices.

Independent Frequency Control

Embodiments of IFC allow not only frequency magnitude control, but also directional control of the spinning eccentrics. This gives us the geometric freedom to vary what kind of trochoid we would prefer (Epitrochoid or Hypotrochoid), and to achieve a very low beat frequency (if the eccentrics are common-rotating ($F_r>0$)) or a higher beat frequency (if they are counter-rotating ($F_r<0$)). Having the flexibility in the field to make such changes in seconds, instead of hours, results in more optimal harvesting and ultimately more money for all parties involved.

Embodiments (both dual-rotor and linearly actuated) allow the quick modification of variables in the field to help with optimizing the shaking for a particular tree or type of tree, which overcomes a major limitation of typical systems. The independent control of the frequencies of two or more oscillators allows the shaker head to deposit appropriate amounts of energy into the frequency bands that are the most helpful for removing product and are the least destructive to the tree.

Figure 2:
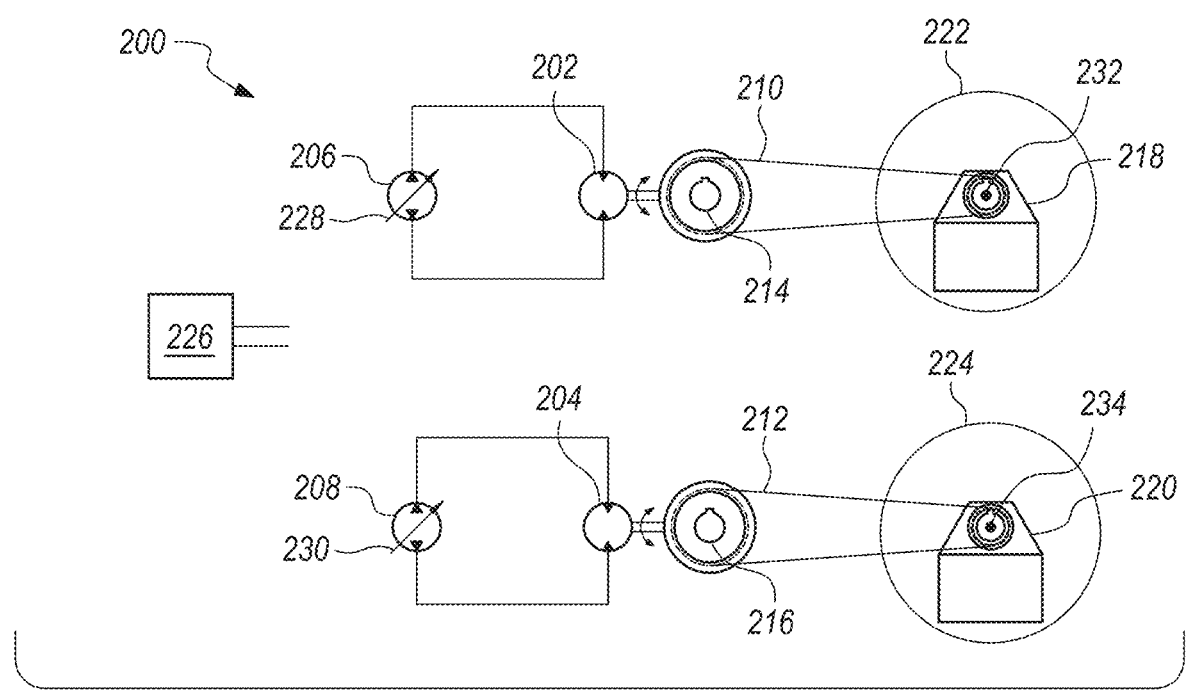
FIG. 2 is a schematic illustrating an embodiment of a system for independent frequency control of a shaker head.
Figure 3:
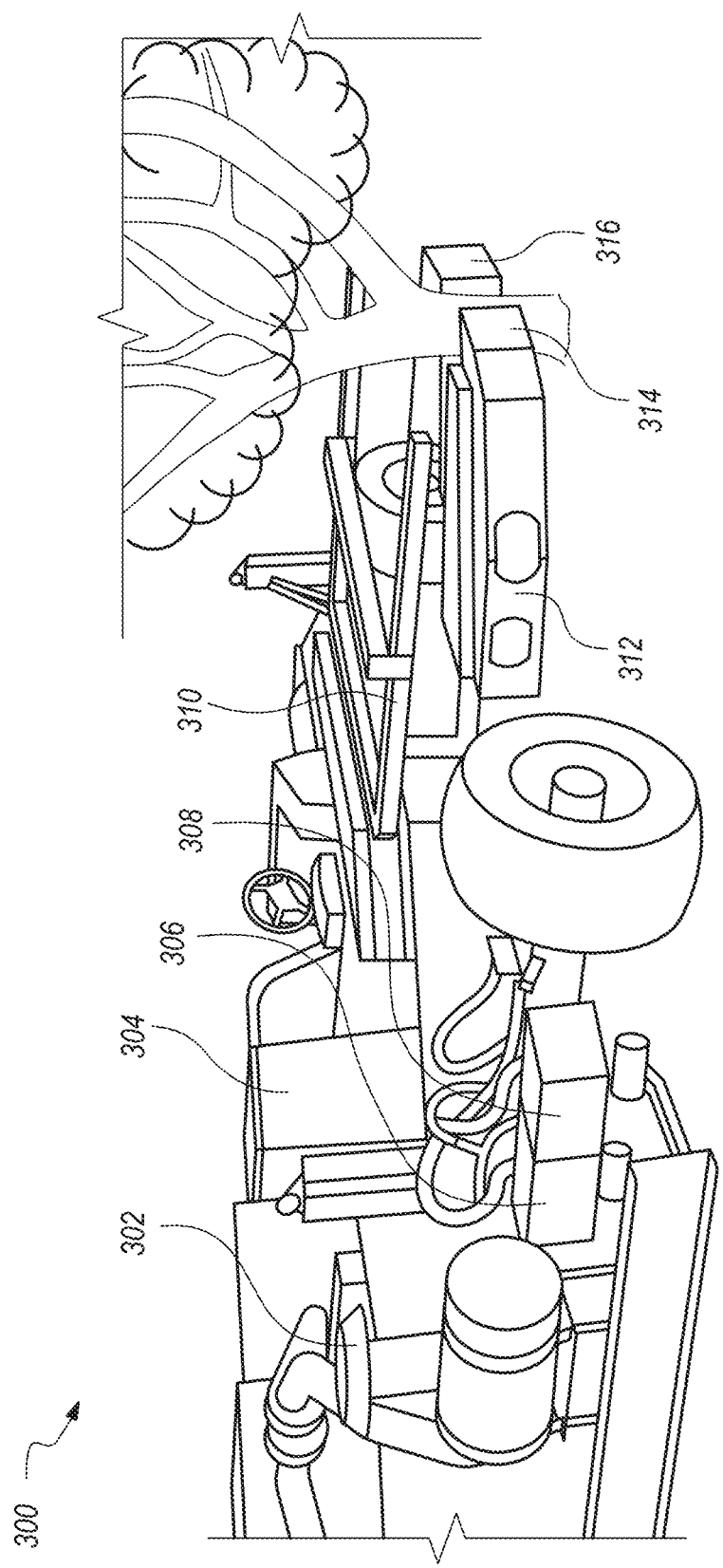
FIG. 3 is a perspective view illustrating an embodiment of a system for independent frequency control of a shaker head employing a dual rotary-actuated shaker head.

FIG. 2 is a schematic illustrating an embodiment of a system 200 for independent frequency control of a shaker head (see, e.g., FIG. 3, head 312). In FIG. 2, a prime mover 226 (e.g., a diesel engine) drives two fixed-displacement hydraulic motors 202, 204 with two variable displacement hydraulic pumps 206, 208. In turn, pumps 206, 208 drive fixed displacement hydraulic motors 202, 204, which by way of sprockets 214, 216 and belt couplers 210, 212 rotate eccentric masses 218, 220 within chambers 222, 224 about axes 232, 234. The rotation of each eccentric mass 218, 220 creates a vibration of the system based on the speed of the rotation. For this reason, systems with rotating masses may be "speed" controlled or "frequency" controlled. The variable displacement, plus directional capabilities (forward or reverse) of pumps 206, 208 provide the independent control needed to accomplish independent frequency control of an eccentric mass 218 and an eccentric mass 220. In the embodiment, variable-displacement pumps 206, 208 each have an electro-hydraulic control unit 228, 230 that interfaced with an onboard computing system (e.g., a computing device 900, FIG. 21) to allow for storing velocity profiles and further interfacing to graphical user interfaces, e.g., embodiments of FFUI.

The configuration of FIG. 2 may be modified in several ways to optimize the energy transfer. For example, by pairing a variable-displacement motor (instead of fixed displacement motors 202, 204) with variable displacement, bi-directional pumps 206, 208 the hydraulic energy transfer stages may be optimized (e.g., as when an automotive transmission optimizes the power transfer from the engine to the tires). For example, for initial start-up shaking speeds, the largest displacement on the variable displacement motor may be used to maximize the torque. Then, then, for higher speeds, a smaller displacement may be used—decreasing torque for increased speed.

Embodiments may employ linear actuators. For embodiments employing linear actuator configurations, it is also preferable that each actuator is controlled independently as was described with respect to the dual-rotor (dual rotating mass) shaker configuration. If not independently controlled, e.g., if a pair of linear actuators were coupled through gearing or circuit topologies that control the actuators in a coupled way relative to each other, the linear actuator arrangement would re-create many of the limitations of the typical dual-rotor actuator.

Linearly-actuated shakers have the ability to generate multiple frequencies at the same time due to the superposition of signals in time. This allows a nearly arbitrary number of primary frequencies with all of the implied beat frequencies that result from those primary frequency interactions. The potential geometric output of linearly actuated systems with two or more actuators that are at least slightly askew is limited by the physical constraints of the actuators (force, displacement, etc.) and the control capability of the control system (control bandwidth, sample time, etc.). In this sense, for embodiments using linearly-actuated shakers the frequency content and geometric position output in the plane of shaking is almost arbitrary.

In an embodiment, a system for independent frequency control of a shaker head may have closed-loop control of the eccentric speed. In the embodiment, an eccentric shaft has a synchronous sprocket. That sprocket is driven directly by a sprocket attached to the shaft of a hydraulic motor (e.g., hydraulic motor 202, FIG. 2). In the embodiment, above the drive sprocket (e.g., sprocket 214, FIG. 2) there may be an additional, smaller sprocket that drives a smaller synchronous belt that goes back to an absolute encoder assembly. With such an absolute encoder assembly, the absolute position of the eccentric shaft may be monitored and used for data acquisition and closed-loop control. An appropriate encoder sensor is made by IFM, model RM8002. An incremental encoder may also be used, provided it can survive the high vibration environment. In the embodiment, an automatic controller may adjust the displacement of a hydraulic pump that controls the speed of a hydraulic motor driving the eccentric mass (e.g., mass 218, FIG. 2). In the embodiment, for feedback (i.e., closed-loop control), the discrete derivative of the digital position of the encoder is calculated, which gives the speed and direction of the motor. This feedback may be fed into a PI controller with gain scheduling (depending on the eccentric configuration) for automatic closed-loop control. Since the reference signal is in terms of the speed over time, this provides the requisite reference and feedback signals to make control automatic. In an embodiment, the speed of the eccentric may be measured by a flow sensor along the flow path between the pump and the motor, since hydraulic oil is essentially incompressible for these purposes. An incremental encoder could have been used (assuming that it could survive the high vibration environment).

Using feedback for closed-loop control purposes is beneficial for several reasons. For a first reason, knowing the actual output speed of the eccentric provides the ability for more consistent, year-to-year shake patterns. Knowing the desired output speed and driving to that output speed reduces considerably the uncertainty in the output speed that may be caused by environmental factors such as oil temperature and component wear. Thus, feedback control reduces the need to re-tune the shaker apparatus to compensate for such environmental factors and improves the consistency of a shake. Consistency is an aspect of the ongoing optimization efforts that growers and harvesters aspire to. For a second reason, because of the complex dynamics experienced by the motors and eccentrics during the course of a shake sequence, automatic control using feedback helps reject the disturbances naturally imposed by the moving-frame of the shaker head and the non-constant loads that present themselves to the motors. By the same token, since each tree responds differently, it is desirable to continue to use the same true shake sequence and not make it dependent on the tree's response to this reference signal. Feedback control allows for individual tailoring (a particular, individual tree receives a custom shake), or group tailoring (each tree of a type of tree receives the same shake), to provide a consistent shake sequence. For a third reason, the transient response may be improved compared to a non-feedback scenario, allowing the proper frequencies and forces at the right time. And steady-state error may be eliminated by using an integrating term in the controller topology (e.g. PI or PID structures).

FIG. 3 is a perspective view illustrating an embodiment of a system 300 for independent frequency control of a shaker head employing a dual rotary-actuated shaker head 312 (also "dual-rotor shaker head"). In FIG. 3, a prime mover 302 is a diesel engine. Prime mover 302 is connected through a gearbox to two independently controlled, variable-displacement hydraulic pumps 306, 308. Pumps 306, 308 are controlled electronically by onboard computing system 304 (within the box). Pumps 306, 308 are hydraulically connected to hydraulic motors (not shown) attached to shaker head 312. Carriage 310 is used to position shaker head 312 with respect to the tree. Hydraulic cylinders cause jaws 314, 316 of shaker head 312 to clamp to the tree. Properly clamped to the tree, shaker head 312 becomes rigidly coupled to the tree and, as a result, may efficiently impart the combined vibratory energies of the independently-controlled force generators (e.g., eccentric rotating masses 218, 220, FIG. 2) into the tree. Jaws 314, 316 have pads that interface between the steel of head 312 and the wood of the trunk.

In the embodiment, shaker head 312 is mounted on overall shaker machinery. The machinery, as is typical, includes a self-propelled chassis with its own power source. In FIG. 3, shaker head 312 is oriented perpendicularly to the wheels' direction of travel. These are called "side-mount" machines. In some embodiments, a shaker head may be mounted on a tractor three-point or skid-steer platform. In some embodiments, shaker head may be mounted to the front of the chassis, which are typically referred to as "mono-boom" machines.

The side-mount chassis of FIG. 3 may be a three-wheeled, or four-wheeled design (not eccentric wheels, but ground-drive wheels). In FIG. 3, shaker head 312 is to the right of the operator cab on a carriage 310, which positions the shaking head appropriately for clamping to the tree using jaws 314, 316 and subsequently for shaking. Shaker head 312 is connected to carriage 310 through some manner of hanger or isolator which provides vertical support but allows head 312 to float as much as possible in the horizontal plane. This basically makes shaker head 312 a pendulum. Thus, it is preferable to make the hanger (not shown) as long as practically possible, to allow nearly planar motion of the head.

Shaker head 312 needs some means of attaching itself (usually termed clamping) to tree. This is typically accomplished by a two-jaw 314, 316 configuration. Others may have three jaws. A rubber pad is typically used to interface with bark of tree to prevent hurting the tree, since most of the time the shaker head is made of steel or another similarly rigid material, so that vibrations may be transmitted efficiently.

The first phase of a shaking sequence involves the positioning of the chassis to get carriage 310 within range of the tree. The second phase involves carriage 310 moving as allowed to position shaker head 312 in the best position to clamp onto the tree. In the third phase, shaker head 312 causes jaws 314, 316 clamp onto the tree. In an embodiment, jaws 314, 316 may move in parallel, opposing directions, and in other embodiments, the jaws may clamp using, e.g., a scissoring action. Once the tree is clamped within jaws 314, 316, the tree-shaker head vibration system is position, clamped, and ready to shake. The fourth phase includes the actual shaking process, which might be different for each tree (as is possible in various embodiments), or may be a perfect copy of the process performed on the previous tree. Once the shake sequence phase has been completed and head 312 has stopped vibrating, jaws 314, 316 are unclamped from the tree, carriage 310 pulls head 312 back from the chassis, and the chassis positions the vehicle for the next tree.

One aspect of an embodiment is the ability to not just change the frequencies independently, but to change them independently and change them during a shake sequence—during the actual shaking. This can be meant two ways and both ways are intended. In an embodiment, the shake sequence may be a pre-programmed set of speeds that generate a proportional set of frequencies during the course of the shake (as discussed, both wheels have independent program vectors). In another embodiment, the user may modify and tune the frequencies in real-time during the shake, the frequency profile for each mass being modified and tuned independently. Being able to store a frequency profile and also program or change a frequency profile in real-time is enabled by a computing system (e.g., computing device 900). In an embodiment, a pre-programmed shake sequence may be initiated and, during the pre-programmed sequence, the user may re-program or change the frequency profile in real time.

Figure 4:
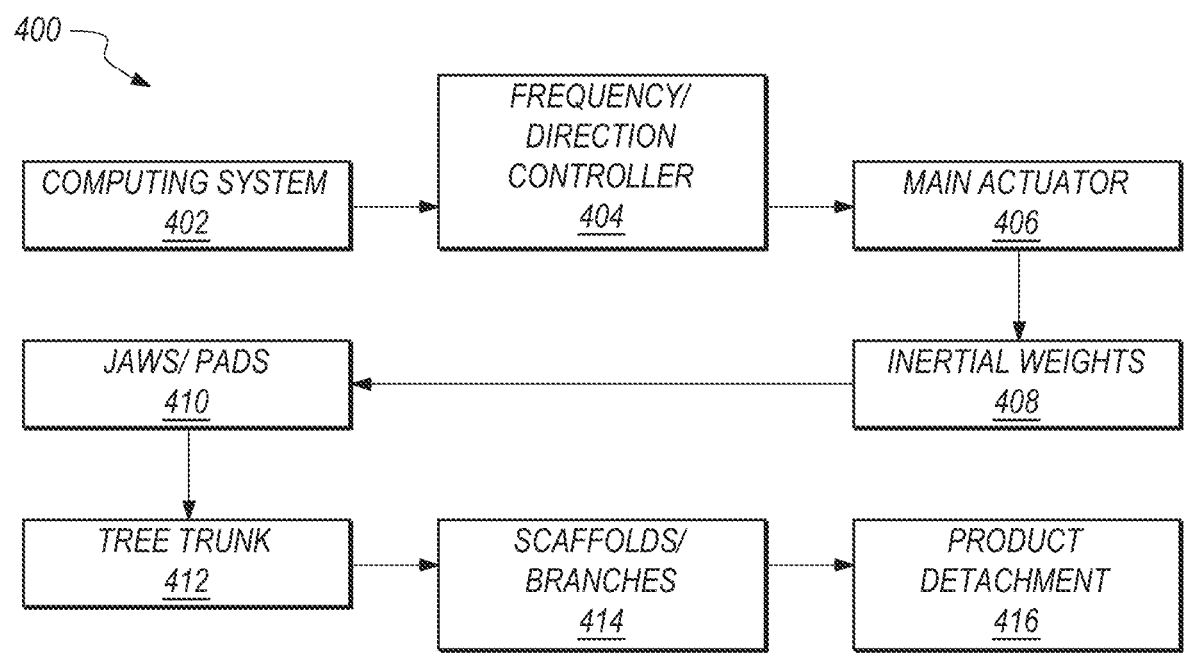
FIG. 4 is a diagram of a control influence chain for an embodiment of independent frequency control of a shaker head.

FIG. 4 is a diagram of a control influence chain 400 for an embodiment of independent frequency control of a shaker head. FIG. 4 illustrates how a computing system 402 (e.g., computing system 900 (FIG. 21)) may interface with a frequency/direction controller 404 to influence a main actuator 406 (e.g., the hydraulic systems depicted for rotating an eccentric mass (e.g., mass 218, FIG. 2). Main actuator 406 influences inertial weights 408, which, when clamped to a tree by jaws/pads 410, influence, in turn, tree trunk 412, branches 414, and finally, product 416. FIG. 4 illustrates how the computing system fits into the signal with the actuators, etc. In an embodiment the VTUI is part of the computing system. Examples of the computing system are described later with regard to FIGS. 8 and 9.

Figure 5:
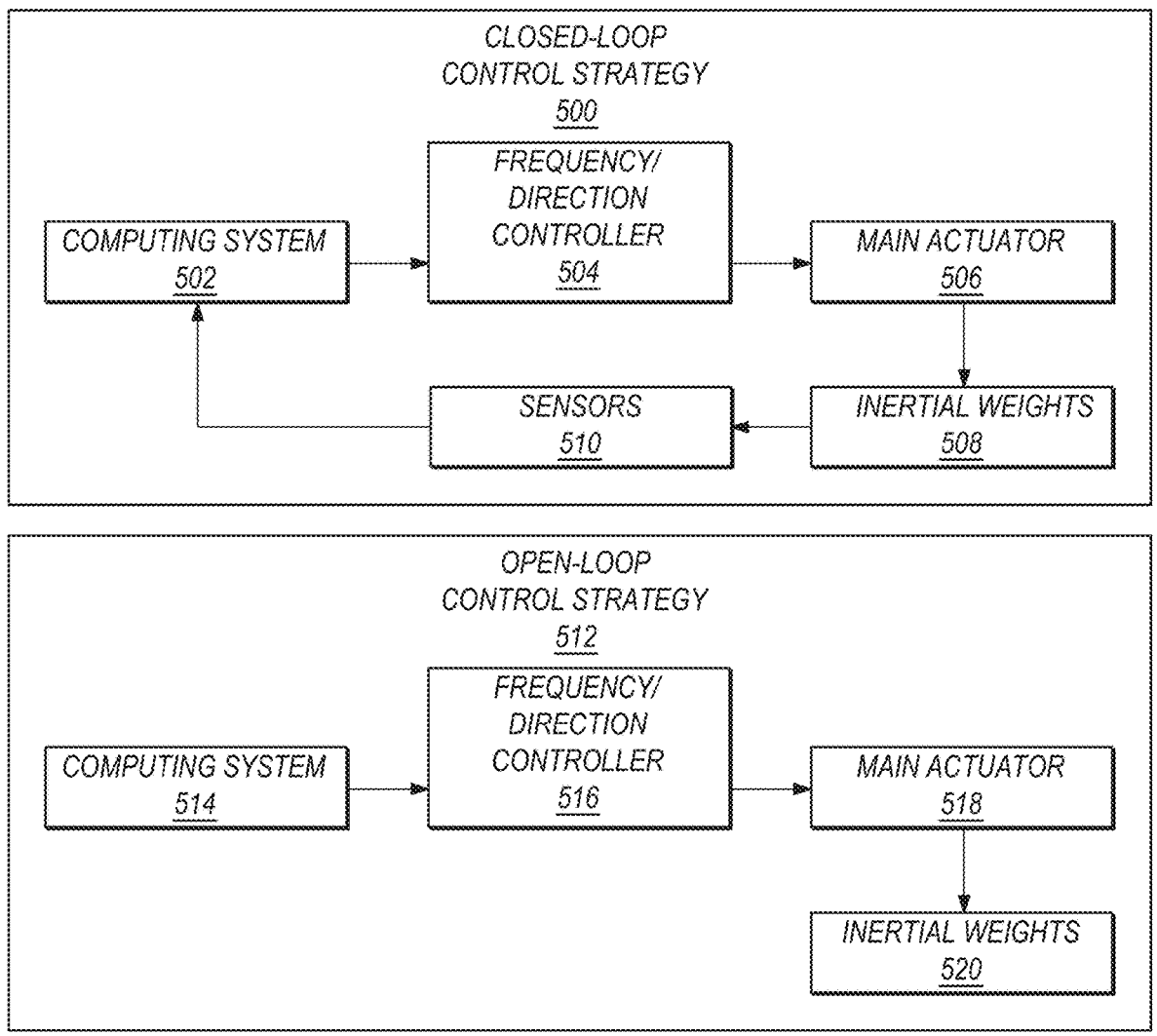
FIG. 5 is a diagram illustrating and comparing closed-loop control of an embodiment of independent frequency control of a shaker head vs. open-loop control of an embodiment of independent frequency control of a shaker head.

FIG. 5 is a diagram illustrating and comparing closed-loop control 500 of an embodiment of independent frequency control of a shaker head vs. open-loop control 512 of an embodiment of independent frequency control of a shaker head. An embodiment may drive the eccentric using an open-loop (not using an automatic-feedback-controller) control 512. An embodiment may drive the eccentrics using a closed-loop control 500 (including a feedback-controller) in order to eliminate (speed accuracy) tuning steps, increase accuracy and consistency and improve transient response. In an example embodiment using open-loop control 512, a computing system 514 provides input to a frequency/direction controller 516, which provides input to a main actuator 518, which provides input to one or more inertial weights 520. In an example embodiment using closed-loop control 500, a computing system 502 provides input to a frequency/direction controller 504, which provides input to a main actuator 506, which provides input to one or more inertial weights 508. Sensors 510 may detect, for example, various aspects of the movement of inertial weights 508 and provide that input to computing system 502, which may modify subsequent input to Frequency/direction controller 504 based on the input from sensors 510.

In times past, the industry attempted to find "silver bullet" shaking setups in the form of a magic pattern (geometry) or magic ratio (since, typically, the ratios are fixed). In contrast, embodiments allow a particular shake sequence to have as complex or simple a velocity profile as the user would prefer ("velocity profile" and "frequency profile" may used interchangeably in this specification—where a velocity profile refers to a rotating eccentric the velocity of rotation determines the frequency). That is, an embodiment may be controlled to imitate a single, specific machine by creating fixed speed/ratio profiles or may be controlled to imitate a combination of a number of different machines (a number of different speed/ratio profiles)—depending on what may be considered best for the tree.

Thus, with embodiments, as the tree evolves, the shake sequence may evolve in an optimal way along with it. This ability to change the shake frequency with time changes the equations, slightly, making $F_1$ and $F_2$ functions of time. In the equation below, $F_1$ and $F_2$ have been expressed as functions of time.

$$x(t) = E_1 \cos(F_1(t)*t) + E_2 \cos(F_2(t)*t) \quad \text{(Eq. 3)}$$

$$y(t) = E_1 \sin(F_1(t)*t) + E_2 \sin(F_2(t)*t) \quad \text{(Eq. 4)}$$

Tuning the System

Having the ability to change frequencies dynamically is very helpful in giving freedom to the operator or supervisor in the field, but also presents another challenge: determining what the frequencies should be now that the frequencies may be changed at will. In an embodiment, the tuning process is abstracted to make the tuning process easier and more intuitive.

At a high level, there are several ways to begin tuning. If simplicity is the goal, tuning may use terminology with which the industry is familiar, such as ratio, speed, and duration. In an embodiment, with the need to view frequency ratios that vary, a graphical user interface may display a timeline view of the speeds. In the embodiment, an interface shows the speeds of each eccentric mass on the vertical axis and time on the horizontal axis. Each timeframe or "slice" may be modified to request a different speed of an individual eccentric at that time. The user via the VTUI interface may edit an existing shake profile, use an existing shake profile to control a shake, directly control the frequency progression during a shake, and record the frequency progression during a shake.

Each of these interfaces is useful in different scenarios. For example, when shaking prune trees, which are not typically as challenging to tune for, it may be most expedient to start shaking with a ratio of 0 (so frequency 1 is 0 and frequency 2 is whatever is chosen) and just see which frequencies the trees respond best to in a simple way. Once a rough exploration has been done, then a ratio that provides an efficient, safe geometry pattern for removal should be chosen. Finally, the duration of shake should be chosen. Since prune trees are somewhat brittle, geometric patterns with "points" that are too sharp can result in broken branches. Regarding "points," referring to FIG. 1 for example, and the plot on the far left with $F_r=-0.83333$, the points are the tips of the flower petals of the geometric output pattern. Sometimes points may be very sharp, sometimes they may be more like big huge loops (as in the other examples of FIG. 1). Also, because higher frequencies tend to work better with materials that are relatively more rigid, the frequency ratio should likely be negative so that the beat frequency will be higher than the two primary frequencies—a negative frequency ratio corresponds to a beat frequency that is higher than the two primary frequencies.

On the other end of the spectrum, olives trees are extremely difficult to effectively shake and the tuning is far more complex. This is true for several reasons. First, the typical pruning style of olive trees is a "weeping willow" shape, which is more challenging to excite. Second, the olives have relatively low mass compared to other fruits/nuts. And third, since shaking an olive tree takes much longer than other crops (e.g., 10-15 seconds compared with 1-3 seconds for others), there is more opportunity for both the tree and the shake to evolve. To begin tuning an IFC-based shake for an olive orchard, an embodiment of a value-time graphical user interface (VTUI) may be valuable, since it allows a person to tune the shake in real-time while watching the tree and seeing it's response.

In an embodiment of a value-time control interface (VTUI) a user may control a shake in real-time by moving a finger or stylus (one or more) a vertical distance away (higher or lower) from the horizontal axis. In an embodiment, a user may record a shake profile for later use by moving a finger or stylus (one or more) a vertical distance away (higher or lower) from the horizontal axis while the VTUI records the input. In an embodiment, when recording a shake profile the time axis scrolls across the display. In an embodiment, the time axis may be fixed. For non-real-time editing, a user may enter the edit mode and edit specific point of an existing trace or may trace the entire desired speed profile for each mass on the display. The effectiveness of a shake profile is determined by a user from watching (and listening) to the response of the tree. As a tree evolves in the shake, the user may begin to see how the shake needs to evolve to keep the tree "in the zone" of optimal shaking. This is an iterative and exploratory process that will be different each time, but is actually much easier than it sounds once a user has a few minutes of training with the interface.

The Value-Time Graphical User Interface (VTUI)

Figure 6:
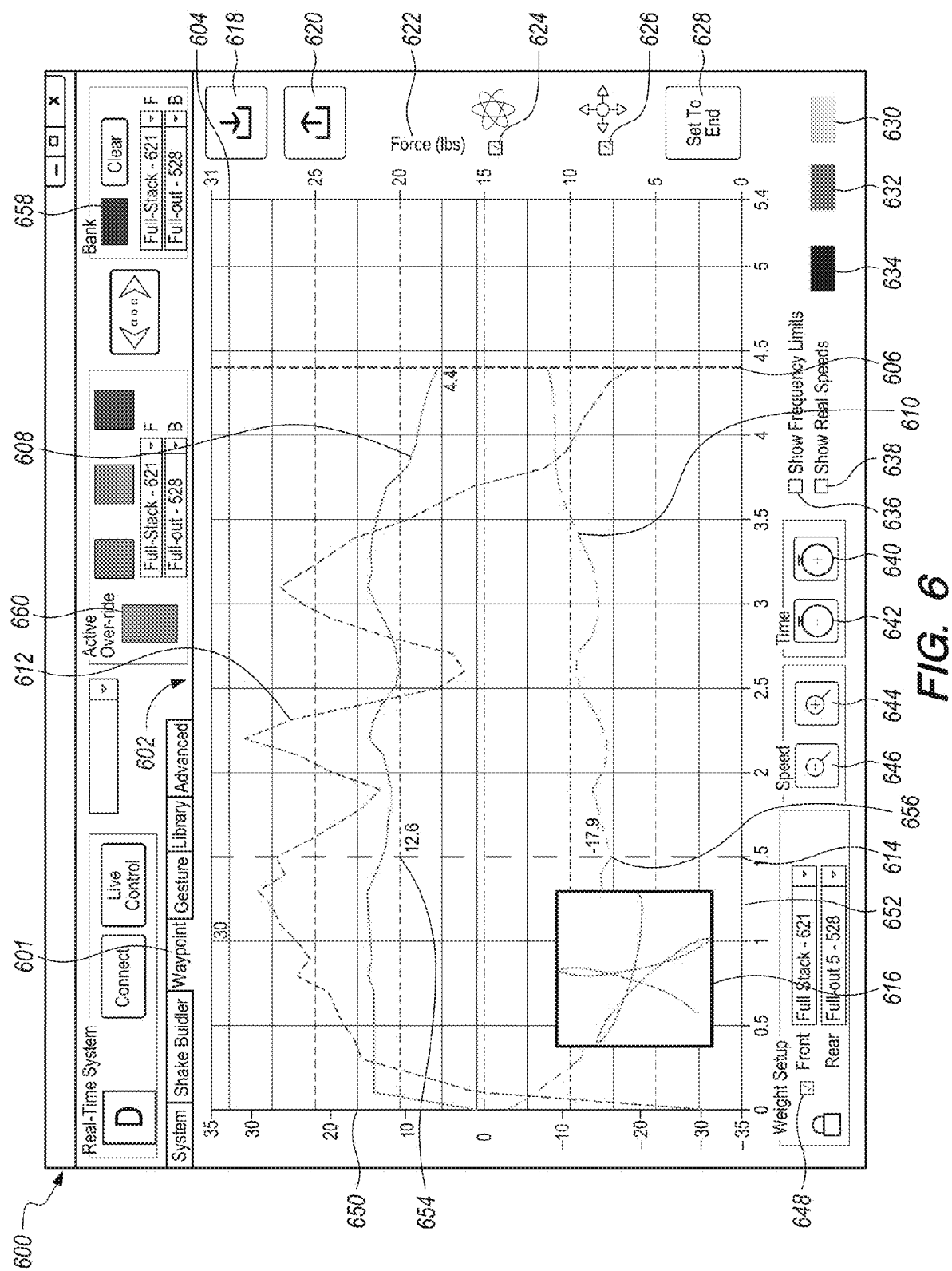
FIG. 6 illustrates a screen shot of an embodiment of a user interface.

FIG. 6 illustrates a screen shot 600 of an embodiment of a value-time user interface (VTUI). In FIG. 6, a waypoint tab 601 includes a main chart area 602 for displaying and plotting the various shake profiles, data, and feedback mechanisms. A force boundary 604 is set at 30 k-lbf. Force boundary 604 may be set according to, e.g., the specifications of a particular shaker head, what is considered appropriate for a type of tree, or what is considered appropriate for a particular tree. Force boundary 604 may vary with time. An end-time line 606 for the shake is shown at approximately 4.4 seconds along a time axis 652. A front mass frequency trace 608 (lime green) displays the vibrating frequency of an inertial mass (in the embodiment, a rotating frequency of an eccentric mass) with respect to time. A rear mass frequency trace 610 (cyan) displays the vibrating frequency of the inertial mass with respect to time. Front and rear frequency traces 608, 610 relate to frequency values from a frequency value axis 650 (in Hz). On frequency axis 650, positive values indicate counter-clockwise rotation of the eccentric mass and negative values indicate clockwise rotation. A force trace 612 (purple) displays the combined force resulting from the front and rear frequencies at a fixed eccentric configuration (a weight setup checkbox 648 is locked, indicating the eccentric configuration is fixed) with respect to time. Force trace 612 relates to a force axis 622 (in thousands of pounds force (klbf)).

A edit/view cursor 614 (dashed) is a vertical line indicating a common point in time on front frequency trace 608, rear frequency trace 610 and force trace 612. A geometric output pattern display window 616 displays the current geometric output pattern. Display window 616 is optionally displayed depending on whether a geometric output pattern display checkbox 624 is checked. The color of a bank 658 indicates a shake pattern in a storage location, which could include a clipboard. A download button 618 copies a shake pattern from bank 658 into the VTUI waypoint tab 601. The color of bank 658 indicates bank 658 toggles between light green and dark green to indicate whether bank 548 contains data or not. An upload button 620 copies the shake profile displayed by waypoint tab 601 in the VTUI into bank 658. A show-frequency-values-at-cursor check box 626 toggles whether to show the actual, numeric values of the front and rear frequency at the intersection of a trace with edit/view cursor 614. A displayed front mass frequency 654 indicates counter-clockwise rotation at 12.6 Hz and a displayed rear frequency indicates a clockwise rotation at 17.9 Hz (−17.9 Hz). A set-to-end button 628 either extends or trims the current profile to match the end-time cursor. A set-to-end button indicator 630 shows whether waypoint tab 601 is in an editing mode that allows editing the end-time of the shake profile. An edit rear indicator 632 shows whether waypoint tab 601 is in an editing mode that allows editing rear frequency trace 610. An edit front indicator 634 shows whether waypoint tab 601 is in an editing mode that allows editing front frequency trace 608. Indicators 630, 632, 634 may be toggled to enable their editing modes. When toggled, indicators 630, 632, 634 change to a lighter version of their respective colors. A show frequency limits check box 636 toggles whether to display the physical frequency limitations of the current system state (they are not displayed). A show real speeds checkbox 638 toggles whether to display the actual response speeds of the system along with the desired, target speeds (actual speeds are not shown in FIG. 6, but see, e.g., FIG. 7, rear actual speed 704 (blue)). A time-zoom-in button 640 zooms in along time axis 652. A time-zoom-out button 642 zooms out along time axis 652. A speed-zoom-in button 644 zooms in along frequency axis 650. A speed-zoom-out button 646 zooms out along frequency axis 650.

In FIG. 6, force guides may be displayed to guide a user in creating a shake profile. Like force trace 612, force guides would represent the sum of the forces exerted by the vibrating first and second masses. The values of the force guides could be chosen based on past experience with shaking similar trees. And the force guides could vary with time. For example, upper and lower force guides could be displayed to suggest that a user develop a shake profile where the force trace for the developed profile remains between the force guides. Similarly, a beat frequency may be displayed to guide a user in creating a shake profile. The beat frequency would represent a difference between the first shaking frequency and the second shaking frequency. The values of the beat frequency guide could be chosen based on past experience with shaking similar trees. And the beat frequency guide could vary with time.

Weight setup checkbox 648 is a synchronization lock, which when unchecked allows the eccentric configuration to be edited as well as viewed independently from the current state of the shaker head, i.e., the current eccentric set-up. Where a shaker head has two eccentric masses, a shake profile has two specific eccentric configurations associated with it. This is due to the fact that a typical shaker head has a singular configuration based on the values of the eccentrics for a specific shake. So, when the shake being edited is "synchronized" with the current configuration of the shaker head it means it has been automatically given the current configuration of the shaker head. If a shake profile in bank 658 was created with a different eccentric configuration than what is currently on the shaker head, the VTUI will not allow that shake profile to be transferred from bank 658 into active slot 660, since the bank eccentric configuration would not match the current shaker head configuration. In this sense, real-time control of the shaker head is "synchronization-locked" because it necessarily is performed using the current eccentric set-up.

In an embodiment, time axis 652 may scroll across the display while a user employs a stylus (e.g., a finger) to control a parameter of the shaker apparatus. For example, a stylus may be designated to represent the front frequency. Upon bringing the stylus into contact with the display, the time axis will start to scroll (i.e., the shake is started). Subsequent movement of the stylus up or down (in the direction of a vertical "value" axis) will cause the front frequency to change accordingly. Upon lifting the stylus, the scrolling of the time axis will stop (i.e., the shake is stopped). In an embodiment, a second stylus may be designated to represent the rear frequency and both front and rear frequencies may be changed upon bringing the styluses into contact with the display. In an embodiment, the scrolling of the time axis is in real-time. That is, the VTUI is used to control the shaking apparatus in real-time, with the shaker head responding to input from the VTUI based on the locations of one or both styluses as they are being moved up or down (in the direction of vertical "value" axis 650). In an embodiment, the scrolling of the time axis and the stylus positions with respect to time are being recorded for future use, e.g., future editing or future use as a shaking pattern.

In an embodiment, a stylus may be designated a front stylus by contacting a "front stylus pad (not shown) within display 602 and the shake started by moving the stylus from the front system pad to a desired frequency. Similarly, a stylus may be designated a rear stylus by contacting a rear stylus pad (not shown) within display 602 and the shake started by moving the stylus from the front system pad to a desired frequency.

In an embodiment, a shake may be initiated in response to the user interface detecting a specific movement. For example, a shake of the first mass may be initiated by the user interface detecting contact outside of a first "origin" zone and then detecting the contact point move within the first origin zone. The user interface would control the first mass according to the subsequent movements of the first contact point from the first origin zone. Similarly, a shake of the second mass may be initiated by the user interface detecting contact outside of a second "origin" zone and then detecting the contact point move within the second origin zone. The user interface would control the second mass according to the subsequent movements of the second contact point from the second origin zone. An embodiment may have only one origin zone. To initiate a first shake of a first mass, the embodiment would detect a first contact and then movement of that contact point into the single origin zone. Similarly, to initiate a second shake of the second mass, the embodiment would detect a second contact and then movement of that contact point into the single origin zone. The user interface would control the first and second masses according to subsequent movements of the first and second contact points, respectively.

In an embodiment, a single stylus or point of contact with the touchscreen may be used to control first and second vibrating masses. In an embodiment, both masses would be set to the same frequency of vibration based on the location of the point of contact. In an embodiment, the first mass may be controlled by the location of the point of contact, with the second mass being controlled according to the location of the first point of contact and a frequency ratio chosen by a user. For example, for a frequency ratio of 2 ($F_1/F_2=2$), the first mass would be control according to the frequency of the contact point and the second mass would be controlled to be twice the frequency of the contact point. In an embodiment, the first mass may be controlled by the location of the point of contact, with the second mass being controlled according to the location of the first point of contact and a beat frequency chosen by a user. For example, for a beat frequency of 20 ($F_1-F_2=20$), the first mass would be controlled according to the frequency of the contact point and the second mass would be controlled to be 20 Hz less than the frequency of the contact point.

Figure 7:
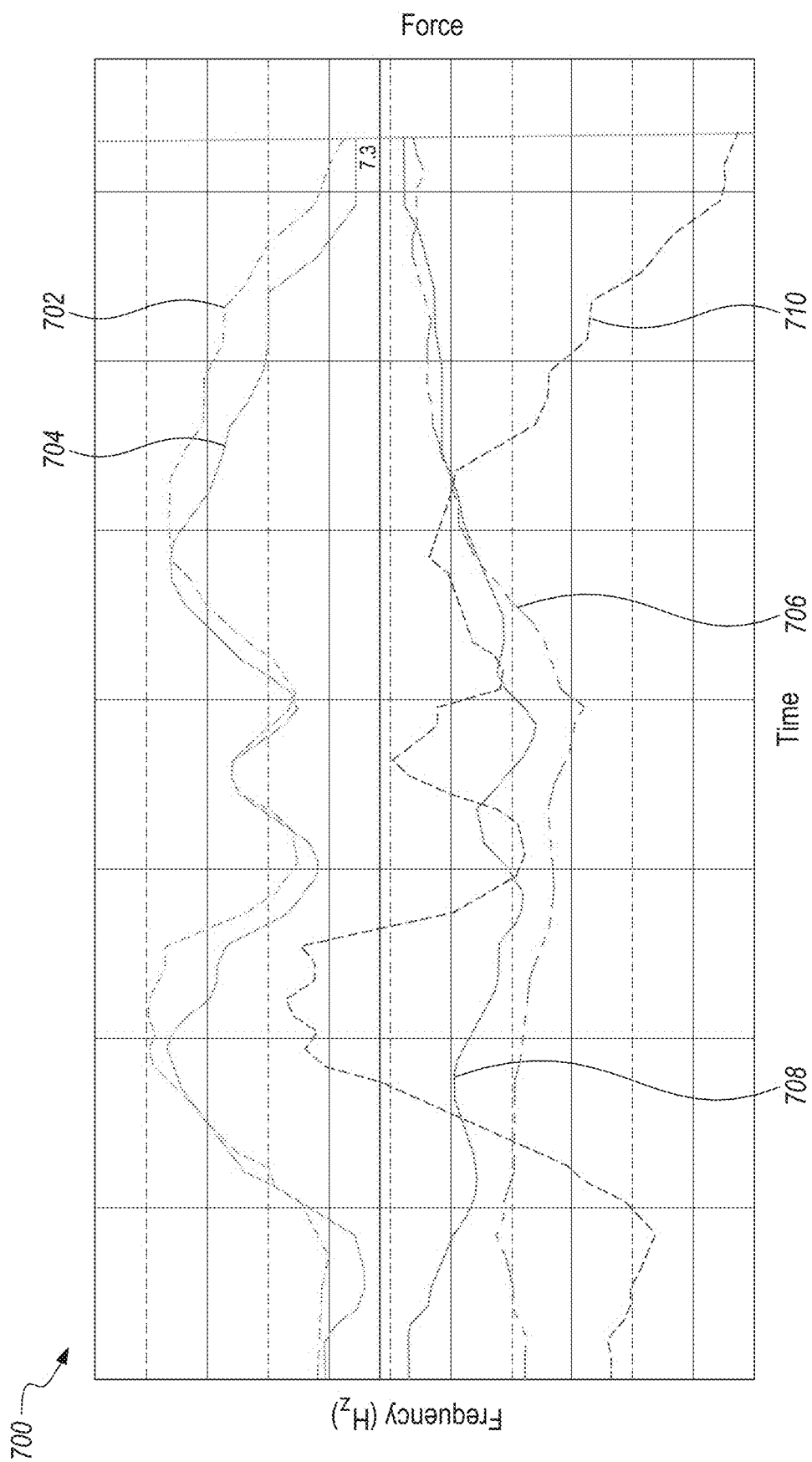
FIG. 7 illustrates a screen shot of an embodiment of a user interface.

FIG. 7 illustrates a screen shot 700 of an embodiment of a value-time user interface (VTUI). In FIG. 7, screenshot 700 shows a portion of a display. The top In FIG. 7, the top pair of blue lines represent the rear frequency with the thicker of the two representing a target rear frequency 702 and the thinner of the two representing an actual rear frequency 704 of the shaker actuator. Similarly, the bottom green lines represent the front actuator frequency with the thicker of the two representing a target front frequency 706 and a thinner of the two representing an actual front frequency 708 of the shaker actuator. A force-time plot line 710 indicates the force exerted by the combination of the two vibrating masses at the frequencies of vibration 702, 706. In an embodiment, a pair of force-time plot lines may be used to indicate, with a thick line, the target force exerted as computed using the target speeds and also, with a line drawn in a visually different line style, the actual force exerted as computed using data of the masses as actually vibrating.

Use-Cases

Importing a shake profile into the VTUI from the bank
Load the bank with a shake profile from some source (VTUI, FFUI, simple parametric profile, library profile, etc.)
In the context of the VTUI, press the "download" button
The shake profile is now loaded in the VTUI
Exporting a shake profile from the VTUI to the bank
In the context of the VTUI (the "Waypoint" tab), press the "upload" button
The bank will now contain a copy of the shake profile that is in the VTUI
Creating a shake profile from scratch
In the context of the VTUI, press the "set end" LED
The "set end" LED will light up, showing that the system is in that mode.
Move the cursor somewhere along the time line of the chart and double-tap or pull up the stylus (e.g., finger) when finished and then make sure that the "set End" LED is off by taping it. This will set the desired end time of the profile.
Press the "Set to End" button. This will either trim or extend the profile that is in the VTUI to be of that duration. All added points will be of value 0.
To sculpt the front frequencies to the desired profile, tap the "edit front" LED. The LED will light up, showing that the edit front mode is on.
Move the stylus over the chart area along the timeline (to the left of the end cursor) and the value of the front frequency (green trace) will match the position of the stylus. In this way the user may "draw" the desired shake profile.
Either double-tap or lift the stylus up and tap the "edit front" LED again to turn it off.
To repeat that with the rear frequency. Tap the "edit rear" LED.
The "edit rear" LED will light up, showing that the GUI is in the "edit rear" mode.
Move the stylus over the chart area along the timeline (to the left of the end cursor) and the value of the rear frequency (cyan trace) will match the position of the stylus. In this way the user may "draw" the desired shake profile.
Either double-tap or lift the stylus up and tap the "edit rear" LED again to turn it off.
To edit the eccentric configuration, tap the checkbox near the synchronization lock icon in the lower-left corner. This will unlock the eccentric drop-down boxes and then changes to the front or rear eccentric configurations may be made.
Editing a shake profile
In the context of the VTUI (the "Waypoint" tab), load a shake.
Move the stylus over the chart area along the timeline (to the left of the end cursor) and the value of the front frequency (green trace) will match the position of the stylus. In this way a user may "draw" a desired profile.
Either double-tap or lift up the stylus and tap the "edit front" LED again to turn it off.
To repeat that with the rear frequency, tap the "edit rear" LED.
The "edit rear" LED will light up, showing that the GUI is in the "edit rear" mode.
Move the stylus over the chart area along the timeline (to the left of the end cursor) and the value of the rear frequency (cyan trace) will match the position of the stylus. In this way a user may "draw" a desired profile.
Either double-tap or lift up the stylus and tap the "edit rear" LED again to turn it off.
To edit the eccentric configuration, tap the checkbox near the synchronization lock icon in the lower-left corner. This will unlock the eccentric drop-down boxes and then the front or rear eccentric configurations may be changed.
To extend the length or make a profile shorter (in time), press the "set end" LED
The "set end" LED will light up, showing that the system is in that edit mode.
Move the cursor somewhere along the time line of the chart and double-tap or pull up the stylus when finished editing, and then make sure that the "set End" LED is off by taping it. This will set the desired end time of the profile.
Press the "Set to End" button. This will either trim or extend the profile that is in the VTUI to be of that duration. All added points will be of value 0.

Benefits of Independent Frequency Control

Olives are considered one of the hardest tree crops to harvest. An embodiment has achieved in olive harvesting what very few harvesting systems can claim: consistently over 90% removal on average. As described above, the performance of a harvester is dependent on many factors that make it difficult to predict efficiency. Still, it is anticipated that embodiments will be able to remove 50-70% of the product that other harvesting systems leave remaining on the tree. For example, with table olives, typical machinery may remove 65% of the total tree's product. That means that of the 35% of the product that remains, it is estimated that embodiments may remove 50-70% of that remaining product—with the result that only 17.5-10.5% of the product remains on the tree. In other words, embodiments are anticipated to increase overall yield to 82.5-89.5%, which maps very well to the experimental results, which have shown 80-90% removal.

In terms of tree health, embodiments may add two to three years of life for any given tree crop due to the reduction in damage to the tree that may be gained from adjusting the geometry output of the head and from not dwelling in frequency bands that may damage the tree. It is also expected that year-to-year health costs will be reduced significantly because of the reduction in damage to trunks, roots, and branches that are often breach points for incoming diseases. If the trees do not contract various diseases or attract pests, then the costs associated with the chemicals and other disease and pest mitigation efforts can be lowered.

Embodiments may also lower harvesting costs because the same embodiment may be easily adapted to multiple different crops. Embodiments are thus able to be used on multiple crops throughout the year, resulting in a better return on investment that current, non-adaptable equipment.

Furthermore, embodiments may provide growers with increased income each year by removing more product from their trees. The increase in removal will also allow growers to spend less money and time removing product that lingers—an operation performed to mitigate pest problems. If enough product is removed by an embodiment, operations directed to mitigating pest problems (e.g., mummy shaking) may be entirely eliminated.

A Computing System for a Frequency/Frequency User Interface

Figure 8:
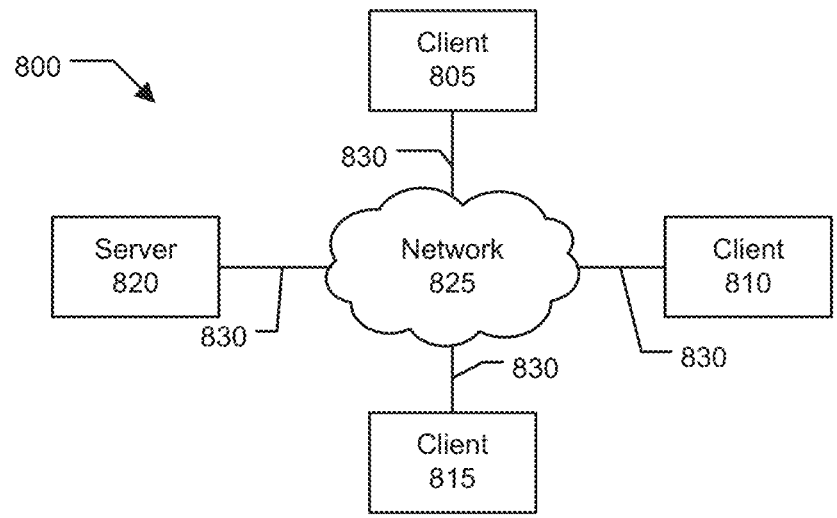
FIG. 8 is a simplified block diagram of a distributed computer network of an embodiment of a system for independent frequency control of a shaker head.

FIG. 8 is a simplified block diagram of a distributed computer network 800 of an embodiment of independent frequency control of a shaker head. Computer network 800 includes a number of client systems 805, 810, and 815, and a server system 820 coupled to a communication network 825 via a plurality of communication links 830. Communication network 825 provides a mechanism for allowing the various components of distributed network 800 to communicate and exchange information with each other. In an embodiment, the onboard computing system of FIG. 3 may be one of client systems 805, 810, and 815 and may be used with an embodiment of VTUI to control embodiments of IFC, or a typical shaker. In an embodiment, the onboard computing system of FIGS. 11 and 12 may itself be controlled by another of client systems 805, 810, and 815 using an embodiment of VTUI to control embodiments of IFC, or a typical shaker.

Communication network 825 may itself be comprised of many interconnected computer systems and communication links. Communication links 830 may be hardwire links, optical links, satellite or other wireless communications links, wave propagation links, or any other mechanisms for communication of information. Various communication protocols may be used to facilitate communication between the various systems shown in FIG. 8. These communication protocols may include TCP/IP, HTTP protocols, wireless application protocol (WAP), vendor-specific protocols, customized protocols, and others. While in one embodiment, communication network 825 is the Internet, in other embodiments, communication network 825 may be any suitable communication network including a local area network (LAN), a wide area network (WAN), a wireless network, a intranet, a private network, a public network, a switched network, and combinations of these, and the like.

Distributed computer network 800 in FIG. 8 is merely illustrative of an embodiment and does not limit the scope of the claims. One of ordinary skill in the art would recognize other variations, modifications, and alternatives. For example, more than one server system 820 may be connected to communication network 825. As another example, a number of client systems 805, 810, and 815 may be coupled to communication network 825 via an access provider (not shown) or via some other server system.

Client systems 805, 810, and 815 typically request information from a server system which provides the information. Server systems by definition typically have more computing and storage capacity than client systems. However, a particular computer system may act as both a client or a server depending on whether the computer system is requesting or providing information. Aspects of the embodiments may use a client-server environment or a cloud-cloud computing environment.

Server 820 is responsible for receiving information requests from client systems 805, 810, and 815, performing processing required to satisfy the requests, and for forwarding the results corresponding to the requests back to the requesting client system. The processing required to satisfy the request may be performed by server system 820 or may alternatively be delegated to other servers connected to communication network 825.

Client systems 805, 810, and 815 enable users to access and query information or applications stored by server system 820. Some example client systems include portable electronic devices (e.g., mobile communication devices) such as the Apple iPhone®, the Apple iPad®, the Palm Pre™, or any device running the Apple iOS™, Android™ OS, Google Chrome OS, Symbian OS®, Windows Mobile® OS, Palm OS® or Palm Web OS™. In a specific embodiment, a "web browser" application executing on a client system enables users to select, access, retrieve, or query information and/or applications stored by server system 820. Examples of web browsers include the Android browser provided by Google, the Safari® browser provided by Apple, the Opera Web browser provided by Opera Software, the BlackBerry® browser provided by Research In Motion, the Internet Explorer® and Internet Explorer Mobile browsers provided by Microsoft Corporation, the Firefox® and Firefox for Mobile browsers provided by Mozilla®, and others.

Figure 9:
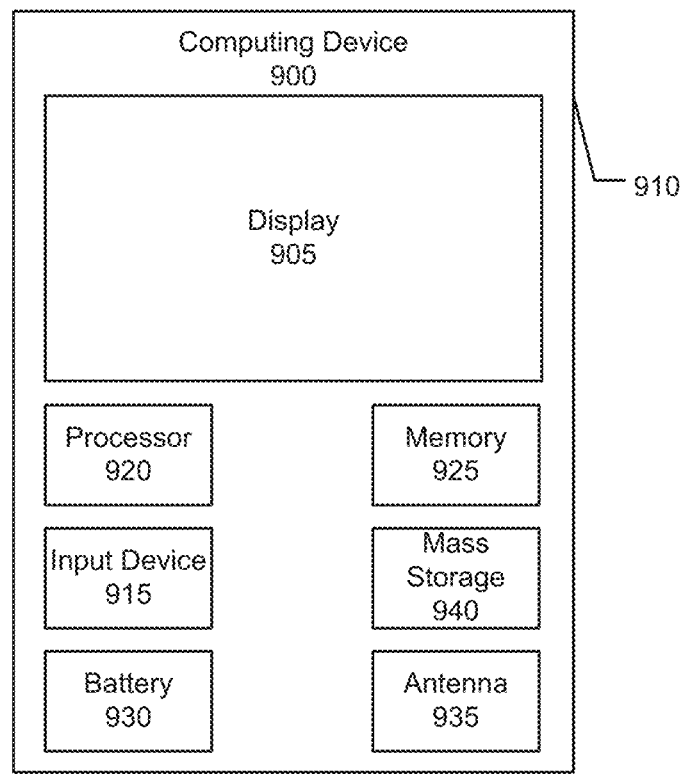
FIG. 9 illustrates an exemplary computing device of an embodiment of a system for independent frequency control of a shaker head.

FIG. 9 shows an exemplary computing device 900, which may serve as any of client systems 805, 810, 815. In an embodiment, a user may use a VTUI to interface with the IFC system (or a typical shaker head) through a client computing device 900, such as shown in FIG. 9. Computing device 900 (which may be, e.g., a personal computer, a mobile client communication device, or a portable electronic device) includes a display, screen, or monitor 905, housing 910, and input device 915. Housing 910 houses familiar computer components, some of which are not shown, such as a processor 920, memory 925, battery 930, speaker, transceiver, antenna 935, microphone, ports, jacks, connectors, camera, input/output (I/O) controller, display adapter, network interface, mass storage devices 940, and the like.

Input device 915 may also include a touchscreen (e.g., resistive, surface acoustic wave, capacitive sensing, infrared, optical imaging, dispersive signal, or acoustic pulse recognition), keyboard (e.g., electronic keyboard or physical keyboard), body movement tracking devices, holographic input devices, buttons, switches, stylus, appendages (fingers), or combinations of these.

Mass storage devices 940 may include flash and other nonvolatile solid-state storage or solid-state drive (SSD), such as a flash drive, flash memory, or USB flash drive. Other examples of mass storage include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), battery-backed-up volatile memory, tape storage, reader, and other similar media, and combinations of these.

Embodiments may also be used with computer systems having different configurations, e.g., with additional or fewer subsystems. For example, a computer system could include more than one processor (i.e., a multiprocessor system, which may permit parallel processing of information) or a system may include a cache memory. The computer system shown in FIG. 9 is but an example of a computer system suitable for use with the present embodiments. Other configurations of subsystems suitable for use with the present embodiments will be readily apparent to one of ordinary skill in the art. For example, in a specific embodiment, the computing device is mobile communication device such as a smartphone or tablet computer. Some specific examples of smartphones include the Droid Incredible and Google Nexus One, provided by HTC Corporation, the iPhone or iPad, both provided by Apple, and many others. The computing device may be a laptop or a netbook. In another specific embodiment, the computing device is a non-portable computing device such as a desktop computer or workstation.

A computer-implemented or computer-executable version of the program instructions useful to practice embodiments may be stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software useful to practice embodiments may be stored or reside in RAM or cache memory, or on mass storage device 940. The source code of this software may also be stored or reside on mass storage device 940 (e.g., flash drive, hard disk, magnetic disk, tape, or CD-ROM). As a further example, code useful for practicing embodiments may be transmitted via wires, radio waves, or through a network such as the Internet. In another specific embodiment, a computer program product is provided that includes a variety of software program code to implement the features.

Computer software products may be written in any of various suitable programming languages, such as Visual Basic, Lua, C, C++, C#, Pascal, Fortran, Perl, MATLAB® (from MathWorks, www.mathworks.com), SAS, SPSS, JavaScript, CoffeeScript, Objective-C, Objective-J, Ruby, Python, Erlang, Lisp, Scala, Clojure, and Java. The computer software product may be an independent application with data input and data display modules. Alternatively, the computer software products may be classes that may be instantiated as distributed objects. The computer software products may also be component software such as Java Beans (from Oracle) or Enterprise Java Beans (EJB from Oracle).

An operating system for the system may be the Android operating system, iPhone OS (i.e., iOS), Symbian, BlackBerry OS, Palm web OS, bada, MeeGo, Maemo, Limo, or Brew OS. Other examples of operating systems include one of the Microsoft Windows family of operating systems (e.g., Windows 95, 98, Me, Windows NT, Windows 2000, Windows XP, Windows XP x64 Edition, Windows Vista, Windows 7, Windows CE, Windows Mobile, Windows Phone 7), Linux, HP-UX, UNIX, Sun OS, Solaris, Mac OS X, Alpha OS, AIX, IRIX32, IRIX64, or QNX. Other operating systems may be used.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system useful in practicing embodiments using a wireless network employing a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

It should be understood that the arrangements of the hardware devices illustrated above are but a few of the possible embodiments and that other arrangements are possible. It should also be understood that the various system components (and means) defined by the claims, described above, and illustrated in the various diagrams represent components that are configured to perform the functionality described herein. For example, one or more of these system components (and means) can be realized, in whole or in part, by at least some of the components illustrated in the arrangement of computing device 900. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIGS. 8 and 9. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description above, the subject matter may be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

It should be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

In the description above and throughout, numerous specific details are set forth in order to provide a thorough understanding of the disclosure. It will be evident, however, to one of ordinary skill in the art, that the disclosure may be practiced without these specific details. In other instances, well-known structures and devices are shown in block diagram form to facilitate explanation. The description of the preferred an embodiment is not intended to limit the scope of the claims appended hereto. Further, in the methods disclosed herein, various steps are disclosed illustrating some of the functions of the disclosure. One will appreciate that these steps are merely exemplary and are not meant to be limiting in any way. Other steps and functions may be contemplated without departing from this disclosure.

What is claimed is:

1. A method for controlling a shaker to simultaneously apply a first shaking frequency of a first mass of the shaker and a second shaking frequency of a second mass of the shaker using a user interface on a computing device, the second shaking frequency being independently variable from the first shaking frequency, the method comprising:
   (i) providing, by the user interface, a display region having a plurality of points, each point in the display region corresponding to:
      a) a frequency corresponding to a frequency axis, the frequency potentially representing one or both of:
         i) the first shaking frequency of the first mass, and
         ii) the second shaking frequency of the second mass; and
      b) a time corresponding to a time axis;
   (ii) detecting, by the user interface, a first selection of a first point of the display region;
   (iii) detecting, by the user interface, the first selection move along a first plurality of points of the display region;
   (iv) for a first subset of the first plurality of points, associating, by the user interface:
      a) a first frequency with each point of the first subset, and
      b) a first time with each point of the first subset;
   (v) detecting, by the user interface, a second selection of a second point of the display region;
   (vi) detecting, by the user interface, the second selection move along a second plurality of points of the display region;
   (vii) for a second subset of the second plurality of points, associating, by the user interface:
      a) a second frequency with each point of the second subset, and
      b) a second time with each point of the second subset; and
   (viii) displaying, by the user interface, a first representation of the first subset of the plurality of points and a second representation of the second subset of the plurality of points.

2. The method of claim 1 further comprising:
   (i) receiving, by the user interface, a command to initiate a shake of the shaker; and
   (ii) in response to the command, controlling, by the user interface:
      a) the first shaking frequency according to the first subset of the plurality of points, and
      b) the second shaking frequency according to the second subset of the plurality of points, wherein:
         the times associated with the first and second subsets overlap at least in part; and
         for at least part of the shake, the first mass is controlled to shake at the same time as the second mass and, while the first and second masses are shaking at the same time, the first shaking frequency is controlled to be different from the second shaking frequency.

3. The method of claim 2 further comprising:
   (i) receiving, by the user interface from the shaker after the initiation of the shake, data of the first shaking frequency and the second shaking frequency: and
   (ii) indicating, by the user interface on the display region, the first shaking frequency and the second shaking frequency.

4. The method of claim 1, wherein:
   (i) the first mass includes a first eccentric mass;
   (ii) the first frequency represents the first shaking frequency of the first eccentric mass, the first shaking frequency resulting from a first rotation of the first eccentric mass; and
   (iii) each point in the display region further corresponds to a direction of rotation of a rotation axis, the rotation axis being parallel to the frequency axis, the direction of rotation representing:
      a) a clockwise rotation of the first eccentric mass,
      b) a counter-clockwise rotation of the first eccentric mass, or
      c) no rotation of the first eccentric mass.

5. The method of claim 1 further comprising:
providing, by the user interface on the display region, a force trace representing a sum of forces exerted by the first and second masses;
providing, by the user interface on the display region, a force guide representing a predetermined sum of forces exerted by the first and second masses; and
providing, by the user interface on the display region, a beat frequency guide associated with a pre-determined difference between the first shaking frequency and the second shaking frequency.

6. The method of claim 1 wherein:
the display region is on a touchscreen;
the first selection is at a first point of contact with the touchscreen;
the first point is the first point of contact with the touchscreen;
the second selection is at a second point of contact with the touchscreen; and
the second point is the second point of contact with the touchscreen.

7. A method for controlling a shaker to simultaneously control a first shaking frequency of a first mass of the shaker and a second shaking frequency of a second mass of the shaker using a user interface on a touchscreen of a computing device, the second shaking frequency being independently variable from the first shaking frequency, the method comprising:

(i) providing, by the user interface on the touchscreen, a display region having a plurality of points, each point in the display region corresponding to:
   a) a frequency corresponding to a frequency axis, the frequency potentially representing one or both of:
      i) the first shaking frequency of the first mass, and
      ii) the second shaking frequency of the second mass; and
(ii) detecting, by the user interface, a first contact with the touchscreen at a first point of contact of the display region;
(iii) initiating, by the user interface in response to detecting the first contact, a first shake of the first mass, the first shaking frequency corresponding to the frequency of the first point of contact;
(iv) continuing to detect, by the user interface, the first contact within the display region;
(v) in response to the continued detecting of the first contact and the first contact moving to a new first point within the display region, setting, by the user interface, the first shaking frequency of the first mass to the frequency corresponding to the new first point;
(vi) detecting, by the user interface, a second contact with the touchscreen at a second point of contact of the display region;
(vii) initiating, by the user interface in response to detecting the second contact, a second shake of the second mass, the second shaking frequency corresponding to the frequency of the second point of contact;
(viii) continuing to detect, by the user interface, the second contact within the display region;
(ix) in response to the continued detecting of the second contact and the second contact moving to a new second point within the display region, setting, by the user interface, the second shaking frequency of the second mass to the frequency corresponding to the new second point;
(x) detecting, by the user interface, a cessation of the first contact and the second contact with the touchscreen; and
(xi) in response to detecting the cessation of the first contact and the second contact, ending, by the user interface, the first shake.

8. The method of claim 7, wherein the first point of contact is within a zone of the display region, and wherein:
(i) the initiating the first shake of the first mass is in response to detecting, by the user interface, the first contact move from a first contacted point outside of the zone to the first point of contact; and
(ii) the initiating the second shake of the second mass is in response to detecting, by the user interface, the second contact move from a second contacted point outside of the zone to the second point of contact.

9. The method of claim 7, wherein:
(i) the first mass includes a first eccentric mass;
(ii) the first frequency represents the first shaking frequency of the first eccentric mass, the first shaking frequency resulting from a first rotation of the first eccentric mass; and
(iii) each point in the display region further corresponds to a direction of rotation corresponding to a rotation axis, the rotation axis being parallel to the frequency axis, the direction of rotation representing:
a clockwise rotation of the first eccentric mass,
a counter-clockwise rotation of the first eccentric mass, or
no rotation of the first eccentric mass.

10. A non transitory, computer-readable media comprising instructions, which when executed by a processor of a computing device with an associated touchscreen, perform the steps of a method for controlling a shaker to simultaneously control a first shaking frequency of a first mass of the shaker and a second shaking frequency of a second mass of the shaker using a user interface on a touchscreen of the computing device, the second shaking frequency being independently variable from the first shaking frequency, the method comprising:
(i) providing, by the user interface on the touchscreen, a display region having a plurality of points, each point in the display region corresponding to:
   a) a frequency corresponding to a frequency axis, the frequency potentially representing one or both of:
      i) the first shaking frequency of the first mass, and
      ii) the second shaking frequency of the second mass; and
(ii) detecting, by the user interface, a first contact with the touchscreen at a first point of contact of the display region;
(iii) initiating, by the user interface in response to detecting the first contact, a first shake of the first mass, the first shaking frequency corresponding to the frequency of the first point of contact;
(iv) continuing to detecting, by the user interface, the first contact within the display region;
(v) in response to the continued detecting of the first contact, and the first contact moving to a new first point within the display region, setting, by the user interface, the first shaking frequency of the first mass to the frequency corresponding to the new first point;
(vi) detecting, by the user interface, a second contact with the touchscreen at a second point of contact of the display region;
(vii) initiating, by the user interface in response to detecting the second contact, a second shake of the second mass, the second shaking frequency corresponding to the frequency of the second point of contact;
(viii) continuing to detect, by the user interface, the second contact within the display region;
(ix) in response to the continued detecting of the second contact and the second contact moving to a new second point within the display region, setting, by the user interface, the second shaking frequency of the second mass to the frequency corresponding to the new second point;
(x) detecting, by the user interface, a cessation of the first contact and the second contact with the touchscreen; and
(xi) in response to detecting the cessation of the first contact and the second contact, ending, by the user interface, the first shake.

11. The computer-readable media of claim 10 wherein the first point of contact is within a zone of the display region, and wherein:
(i) the initiating the first shake of the first mass is in response to detecting, by the user interface, the first contact move from a first contacted point outside of the zone to the first point of contact; and
(ii) the initiating the second shake of the second mass is in response to detecting, by the user interface, the second contact move from a second contacted point outside of the zone to the second point of contact.

12. The computer-readable media of claim 10, wherein:
(i) the first mass includes a first eccentric mass;

(ii) the first frequency represents the first shaking frequency of the first eccentric mass, the first shaking frequency resulting from a first rotation of the first eccentric mass; and
(iii) each point in the display region further corresponds to a direction of rotation corresponding to a rotation axis, the rotation axis being parallel to the frequency axis, the direction of rotation representing:
a clockwise rotation of the first eccentric mass,
a counter-clockwise rotation of the first eccentric mass, or
no rotation of the first eccentric mass.

\* \* \* \* \*